US007143138B2

(12) United States Patent
Imanishi

(10) Patent No.: US 7,143,138 B2
(45) Date of Patent: Nov. 28, 2006

(54) METHOD, COMPUTER READABLE MEDIUM, INFORMATION-MANAGING SYSTEM AND SERVER DEVICE FOR DETECTING A TERMINAL LOCATION AND SENDING CORRESPONDING PREDETERMINED INFORMATION

(75) Inventor: Akiko Imanishi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 10/095,059

(22) Filed: Mar. 12, 2002

(65) Prior Publication Data

US 2003/0018711 A1 Jan. 23, 2003

(30) Foreign Application Priority Data

Jul. 17, 2001 (JP) ............................. 2001-216433

(51) Int. Cl.
*G06F 15/16* (2006.01)
*H04Q 7/20* (2006.01)
(52) U.S. Cl. ..................................... 709/206; 455/456.3
(58) Field of Classification Search ................ 709/203, 709/206; 455/456.1, 456.3; 701/213
See application file for complete search history.

(56) References Cited

U.S. PATENT DOCUMENTS 5,938,721 A * 8/1999 Dussell et al. .............. 701/211
6,122,520 A * 9/2000 Want et al. ............... 455/456.2
6,360,101 B1 * 3/2002 Irvin ......................... 455/456.6
6,587,835 B1 * 7/2003 Treyz et al. ................... 705/14
6,650,902 B1 * 11/2003 Richton .................... 455/456.3
6,680,675 B1 * 1/2004 Suzuki ......................... 340/988
6,799,049 B1 * 9/2004 Zellner et al. ........... 455/456.1
2002/0086680 A1 * 7/2002 Hunzinger .................. 455/456
2003/0003922 A1 * 1/2003 McClure ..................... 455/456

FOREIGN PATENT DOCUMENTS

| JP | 2-187898 | 7/1990 |
| JP | 5-19684 | 1/1993 |
| JP | 5-336565 | 12/1993 |
| JP | 10-191436 | 7/1998 |
| JP | 2000-156882 | 6/2000 |

* cited by examiner

*Primary Examiner*—William Vaughn
*Assistant Examiner*—Yemane M. Gerezgiher
(74) *Attorney, Agent, or Firm*—Staas & Halsey LLP

(57) ABSTRACT

A method of managing information includes the steps of pre-registering predetermined information to be sent to at least one portable terminal in such a manner that the predetermined information is linked to first location information, detecting a current location of the portable terminal such that the current location serves as second location information, and comparing the second location information to the first location information so as to determine whether to send the predetermined information to the portable terminal. The method further includes the step of reading out the predetermined information linked to the first location information and sending the predetermined information to the portable terminal.

8 Claims, 17 Drawing Sheets

FIG.4

| ACCESS CODE | SHOP NAME | TARGET LOCATION | | | CONTENT | VALIDITY PERIOD | |
| --- | --- | --- | --- | --- | --- | --- | --- |
| | | X(LAT.) | Y(LONG.) | Z(ALT.) | | START | END |
| 0010234 | AAA | ... | ... | ... | WINTER FINAL CLEARANCE SALE | 11/01 | 11/14 |
| 0010244 | BBB | ... | ... | ... | DAY PLANNER FINAL CLEARANCE SALE | 04/01 | 04/07 |
| 0020334 | CCC | ... | ... | ... | SPRING NEW CONFECTIONARY | 01/01 | 01/14 |
| 0010334 | DDD | ... | ... | ... | SPRING NEW CONFECTIONARY | 01/01 | 01/14 |

FIG.5

| ACCESS CODE | ADDRESSEE | APPROACH DISTANCE (m) | VALIDITY PERIOD FLAG (no:0 START:1 END:2) |
|---|---|---|---|
| 0010234 | user01@fhs.com | 100 | 0 |
| 0010244 | user02@fhs.com | 300 | 1 |
| 0010234 | user01@fhs.com | 100 | 2 |

FIG.8

| LONG-DISTANCE CODE | TELEPHONE NUMBER | | LOCATION COORDINATE | | |
|---|---|---|---|---|---|
| | CODE1 | CODE2 | X(LAT.) | Y(LONG.) | Z(ALT.) |
| 001 | 1 | 2-0001 | ... | ... | ... |
| | | 2-0002 | ... | ... | ... |
| | | 2-0003 | ... | ... | ... |
| | | 2-0004 | ... | ... | ... |
| | | 2-0005 | ... | ... | ... |
| | | 2-0006 | ... | ... | ... |
| | 2 | 2-0001 | ... | ... | ... |
| | | 2-0002 | ... | ... | ... |
| | | 2-0003 | ... | ... | ... |
| | | 2-0004 | ... | ... | ... |
| | | 2-0005 | ... | ... | ... |
| | | 2-0006 | ... | ... | ... |

FIG.9

| ACCESS CODE | NUMBER OF USES (@10YEN) | NUMBER OF SENDINGS (@100YEN) |
|---|---|---|
| 0010234 | 100 | 50 |
| 0010244 | 200 | 50 |
| 0020334 | 400 | 10 |
| 0010334 | 200 | 100 |

FIG.14

| ACCESS CODE | APPROACH DISTANCE (m) | TARGET LOCATION ||| VALIDITY PERIOD ||
|---|---|---|---|---|---|---|
| | | X(LAT.) | Y(LONG.) | Z(ALT.) | START | END |
| 0010234 | 100 | ... | ... | ... | 11/01 | 11/14 |
| 0010244 | 300 | ... | ... | ... | 04/01 | 04/07 |
| 0010234 | 100 | ... | ... | ... | 01/01 | 01/14 |

METHOD, COMPUTER READABLE MEDIUM, INFORMATION-MANAGING SYSTEM AND SERVER DEVICE FOR DETECTING A TERMINAL LOCATION AND SENDING CORRESPONDING PREDETERMINED INFORMATION

BACKGROUND OF THE INVENTION

1. Field of the Invention

The present invention relates to an information-managing method, a computer readable medium, an information-managing system and a server device, and particularly relates to an information-managing method, a computer readable medium, an information-managing system and a server device for detecting current location of a portable terminal and sending predetermined information corresponding to the current location to the portable terminal.

2. Description of the Related Art

Many people keep their own memorandum or to-do-lists so as not to forget what they have to do. For example, when one finds an advertisement of an article of a shop of interest, he/she finds the address or location of the shop from the advertisement or the article and keeps the address in the memorandum or memorizes the place of the shop and visits the shop when convenient. When one needs to do something at a certain location such as banking facilities, he/she lists things to do in the to-do-list or memorandum or memorizes them and actually does things when convenient.

Conventionally, when one wishes to do a certain thing at a certain location, he/she kept the information about the location and things to be done in the memorandum or memorized them in his/her mind.

However, one might not check the memorandum and totally forget about the things to do at the time he/she passes near or actually visits the listed or memorized location.

Also, in a case where someone who has found an advertisement or an article in newspapers or magazines about the shop that interests him/her and attempts to visit the shop from information provided in the advertisement or the article, it often happens that he/she cannot find the shop although he/she is at a location near the shop.

Also, even if someone who has found an advertisement or an article in newspapers or magazines about the shop that interests him/her wishes to visit the shop when convenient, he/she might totally forget about visiting the shop at the time he/she passes near the shop.

SUMMARY OF THE INVENTION

Accordingly, it is a general object of the present invention to provide an information-managing method, a computer readable medium, an information-managing system and a server device that can obviate the problems described above.

It is another and more specific object of the present invention to provide an information-managing method, a computer readable medium, an information-managing system and a server device that can remind the user of the portable terminal about the information of interest and that can send predetermined information corresponding to the current location of the portable terminal.

In order to achieve the above object a method of managing information includes the steps of:

a) pre-registering predetermined information to be sent to at least one portable terminal in such a manner that the predetermined information is linked to first location information;

b) detecting a current location of the portable terminal such that the current location serves as second location information;

c) comparing the second location information to the first location information so as to determine whether to send the predetermined information to the portable terminal; and d) reading out the predetermined information linked to the first location information and sending the predetermined information to the portable terminal.

With the method described above, a location corresponding to predetermined information is pre-registered as first location information. Therefore, based on a relationship between the first location corresponding to the predetermined information and the current location of the portable terminal, the predetermined information related to the current location of the portable terminal can be sent to the portable terminal. For example, when a distance between the first location corresponding to the predetermined location and the current location of the portable terminal becomes less than a predetermined distance, the predetermined information related to the current location of the portable terminal can be sent to the portable terminal.

A computer readable medium, an information-managing system and a server device for detecting current location of a portable terminal and sending predetermined information corresponding to the current location to the portable terminal are also provided according to the present invention.

Accordingly, since the user of the portable terminal can pre-register predetermined information he/she does not want to forget linked with a location corresponding to the predetermined information, it is possible to remind the user about the information he/she does not want to forget.

BRIEF DESCRIPTION OF THE DRAWINGS

FIG. 4 is a diagram showing an example of a pre-registered information database.

FIG. 5 is a diagram showing an example of a usage information DB.

FIG. 8 is a diagram showing an example of a GPS information DB.

FIG. 9 is a diagram showing an example of a billing information DB.

FIG. 14 is a diagram showing another example of the usage information DB.

DETAILED DESCRIPTION OF THE PREFERRED EMBODIMENTS

In the following, principles and embodiments of the present invention will be described with reference to the accompanying drawings.

Figure 1:
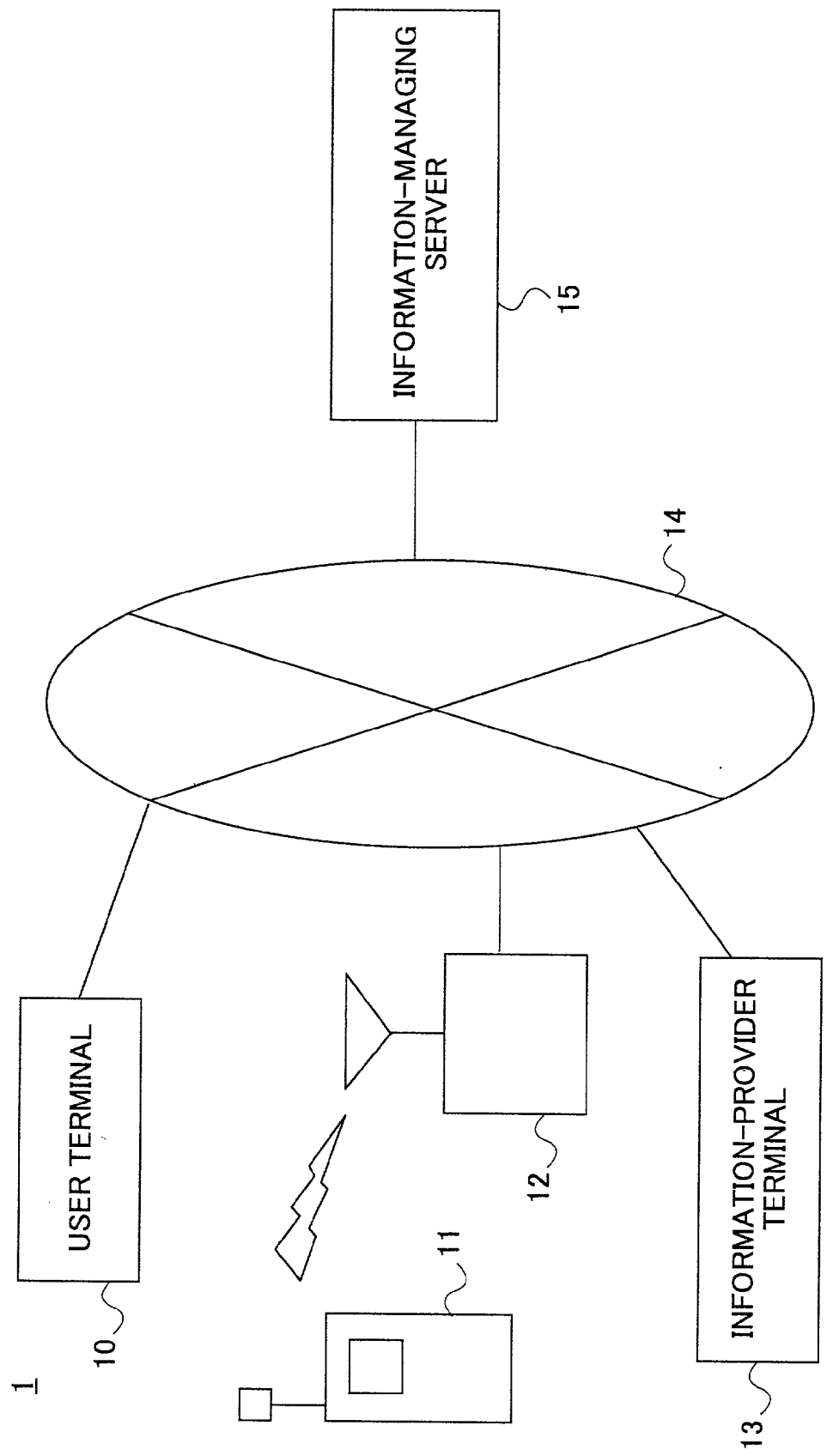
FIG. 1 is a schematic diagram of an embodiment of a system including an information-managing server of the present invention.

FIG. 1 is a diagram of an embodiment of an information-managing system including an information-managing server of the present invention. As shown in FIG. 1, an information-managing system 1 includes a user terminal 10, a portable terminal 11, base station 12, an information-provider terminal 13, a network 14 such as the Internet and an information-managing server 15. For the sake of clarity, FIG. 1 shows one each of the user terminal 10, the portable terminal 11, the base station 12 and the information-provider terminal 13, but more than one of each of these elements may be included in the system of the present invention.

The user terminal 10, the base station 12, the information-provider terminal 13 and the information-managing server 15 are connected via the network 14. The portable terminal 11 is connected to the base station 12 via a radio network and is also connected to the network 14 via the base station 12.

The user terminal 10 and the portable terminal 11 are operated by a user using an information-managing method of the present invention. The user terminal 10 has a communication capability for establishing communications with the information-managing server 15 via the network 14. The portable terminal 11 is a device that can be carried by the user. The portable terminal 11 may be a portable telephone that has a communication capability for establishing communications with the information-managing server 15 via the network 14 and a function for sending/receiving e-mail.

For example, when the network 14 is the Internet, the user terminal 10 and the portable terminal 11 are configured as terminals connectable to the Internet that have a function of making access to Web pages stored in the information-managing server 15.

The information-provider terminal 13 is operated by an information provider who is providing information (such as advertisements) for the user. The information-provider terminal 13 has a communication function for establishing communications with the information-managing server 15 via the network 14. For example, when the network 14 is the Internet, the information-provider terminal 13 is a terminal connectable to the Internet and having a function of accessing Web pages stored in the information-managing server 15.

The information-managing server 15 stores various information required for implementing the information-managing method of the present invention from the user terminal 10, the portable terminal 11 and the information-provider terminal 13. Information stored in the information-managing device 15 includes information contents to be sent to the terminal device 11, target locations that the information contents are related to and validity periods set for the information contents. Information content includes data related to an event carried out at the target location.

The information-managing server 15 detects the present location of the portable terminal 11 at a predetermined interval (e.g., 30 seconds). In accordance with a distance between the present location and the target location, the information-managing server 15 sends to terminal device 11 the information contents related to the detected target location. For example, when there is a target location in which the present location and the target location are less than a predetermined distance (for example, less than 50 meters) apart, the information content corresponding to the detected target location will be sent to the portable terminal 11.

Further, the information-managing server 15 has a function of establishing communications with the user terminal 10, the portable terminal 11 and the information-provider 13 via the network, a function for performing a billing process and a function for assisting a management process. For example, when the network 14 is the Internet, the information-managing server 15 has a function of sending at least one Web page to the portable terminal 11 and the information-provider terminal 13.

The information management server 15 makes use of the Web pages to encourage various useful information for implementing the information-managing method of the present invention to be registered through the user terminal 10 and the portable terminal 11.

Figure 2:
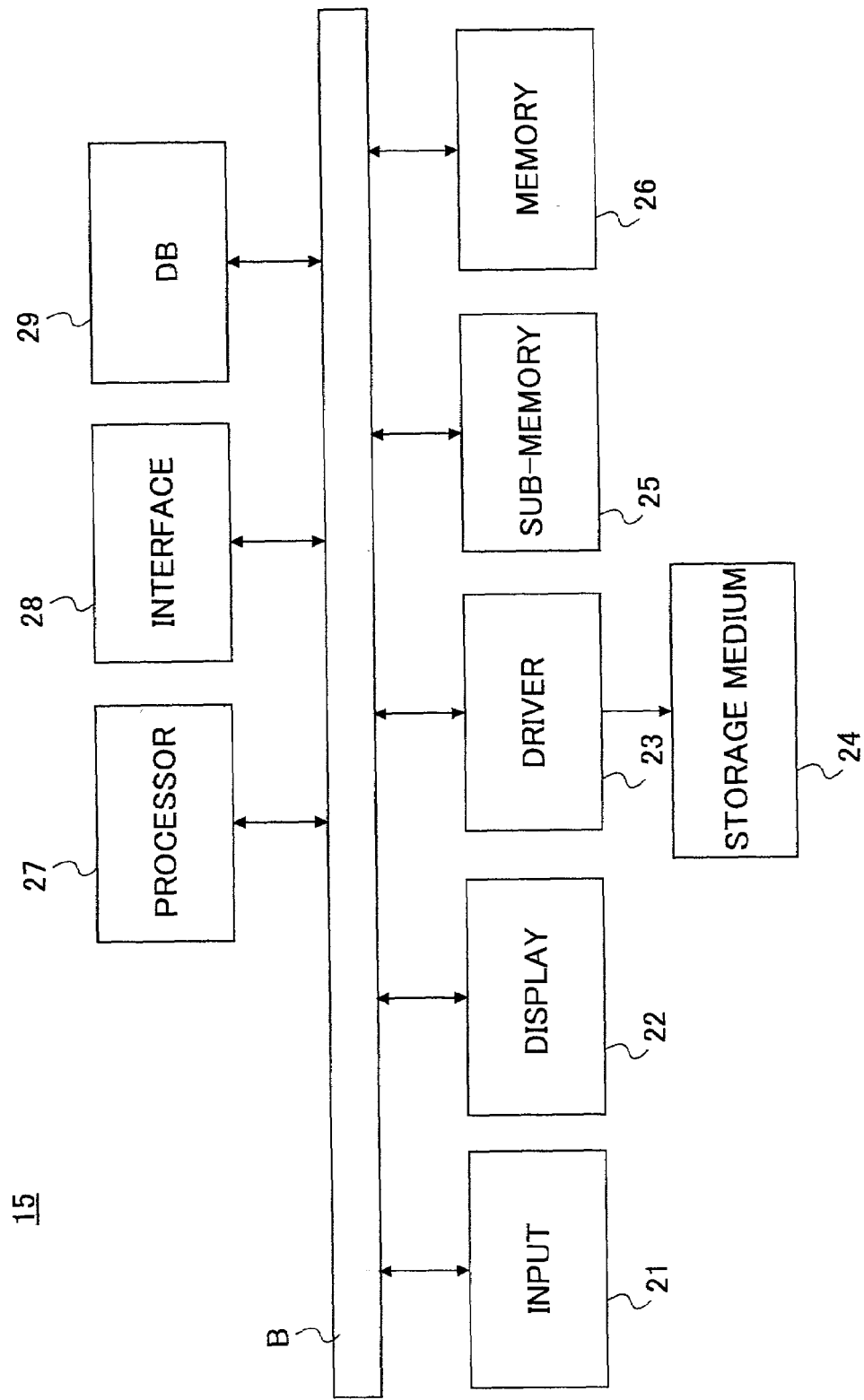
FIG. 2 is a block diagram of an embodiment of the information-managing server of the present invention.

The information-managing server 15 is configured as shown in FIG. 2. FIG. 2 is a block diagram of an embodiment of the information-managing server 15 of the present invention. The information-managing server 15 shown in FIG. 2 includes an input unit 21, a display unit 22, a drive unit 23, a storage medium 24, a sub-memory unit 25, a memory unit 26, an operation processing unit 27, an interface unit 28 and a data base (hereinafter referred to as a DB) 29, each being mutually connected via a bus B.

The input unit 21 may be a keyboard and/or a mouse operated by the user of the information-managing server 15 and is used for inputting various operation signals to the information-managing server 15. The display unit 22 displays various windows and data required for operating the information-managing server 15. The interface unit 28 is an interface for connecting the information-managing server 15 to the network 14 and may be configured as a MODEM or a Router.

The DB 29 stores various information required for achieving the information-managing method of the present invention. The DB 29 may include a pre-registered information DB, a usage information DB, a billing information DB, a GPS (Global Positioning System) information DB and a map information DB. The pre-registered information DB, the usage information DB, the billing information DB, the GPS information DB and the map information DB will be described in detail later.

The information managing program executable on the information-managing server 15 is provided on the storage medium 24 such as a CD-ROM. The storage medium 24 is not limited to a CD-ROM but may also include a storage medium for optically, electrically or magnetically storing information such as a floppy disk and a magneto-optical disk (MO) and a solid-state memory for electrically storing information such as a ROM (Read-Only Memory) and a FLASH memory.

The storage medium 24 on which the information management program is recorded is inserted into the drive unit 23 and the information management program is installed from the recording medium 24 to the sub-memory unit 25 via the drive unit 23.

The sub-memory unit 25 stores the installed information management program and also stores required files and data. The memory unit 26 reads the information management program from the sub-memory unit 25 when the information-managing server 15 is started up, and stores the information management program read out from the sub-memory unit 25. The operation-processing unit 27 performs processes to be performed on the information-managing server 15 in accordance with the information management program that is read out from the sub-memory unit 25 and stored in the memory unit 26.

Figure 3:
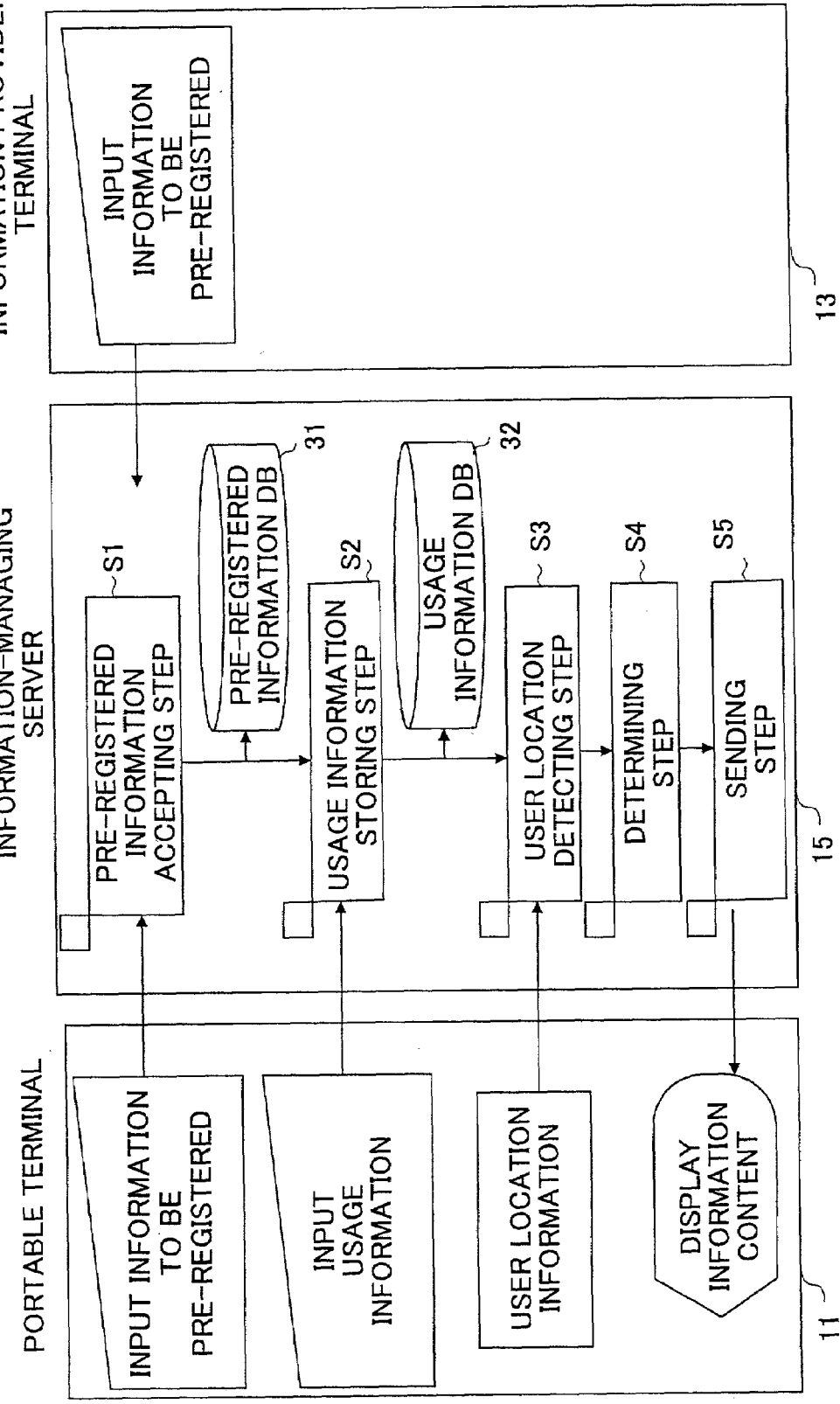
FIG. 3 is a flowchart of an embodiment of an information-managing method according to the present invention.

In the following, a process performed by the system 1 embodying the information-managing method of the present invention will be described. FIG. 3 shows a flowchart of an embodiment of the information-managing method of the present invention.

For example, when the user wishes a certain information content to be sent at a certain location to the portable terminal 11, the user operates the portable terminal 11 or the user terminal 10 to transmit pre-registered information to the information-managing server 15. The pre-registered information includes items such as target location, information content and validity period. FIG. 3 shows an example in which information to be pre-registered is transmitted from the portable terminal 11 to the information-managing server 15.

On the other hand, the information-provider offering information (for example advertisements) operates the information-provider terminal 13 to transmit registration information to the information-managing server 15. The information-provider registration information includes items such as an access code for identifying information, shop-name, target location, information content and validity period.

After receiving information to be pre-registered from the user terminal 10 or the portable terminal and the registration information from the information-provider terminal 13, the information-managing server 15 proceeds to a registration information accepting step S1 where the received registration information is stored in a pre-registered information DB 31 shown in FIG. 4. It is to be noted that FIG. 3 shows an example in which the information to be pre-registered received from the information-provider terminal 13 is stored in the pre-registered information DB 31, but the information to be pre-registered may also be transmitted to the information-managing server 15 so that the operator of the information-managing server 15 can store the registration information in the pre-registered information DB 31.

FIG. 4 is a diagram showing an example of the pre-registered information DB. The pre-registered information DB 31 shown in FIG. 4 includes items such as access code, shop name, target location, information content and validity period. The access code is provided for identifying the pre-registered information. The access code may be determined by a salesperson operating the information-provider terminal 13 or may be determined by the information-managing server 15.

The target location represents where the location of the information content is located, and may for example be expressed by latitude, longitude and altitude. The information content represents content to be sent to the portable terminal 11 and, for example, includes text such as "Winter Final Clearance Sale". The information content is not limited to text data but may also include image data.

It is to be noted that the pre-registered information DB 31 of FIG. 4 is only an example, and not all items are necessary. For example, when the user registers an event to be done at a certain location without setting a validity period, the pre-registered information DB 31 includes target location and information content.

In usage information storing step S2, the user using the portable terminal 11 operates the user terminal 10 or the portable terminal 11 and selects desired pre-registered information from the pre-registered information DB 31. FIG. 3 shows an example in which the portable terminal 11 is operated to select the desired pre-registered information from the pre-registered information DB 31.

The user of the portable terminal 11 can readily select the desired pre-registered information from the pre-registered information DB 31 by using the access code as described below. The information-provider wishing to offer information such as an advertisement to the user of the portable terminal 11 may put an advertisement with an access code in newspapers or in magazines.

When the user of the portable terminal 11 looks through newspapers or magazines, finds an advertisement of a shop of interest and wishes to visit the shop, the user of the portable terminal 11 operates the user terminal 10 or the portable terminal 11 to transmit the access code contained in the advertisement to the information-managing server 15. The access code may be input in the portable terminal 11 by various means such as a barcode. The access code may also be input by displaying the access code on a screen of a device such as a digital TV and scanning the displayed access code.

When the information-managing server 15 receives the access code from the user terminal 10 or the portable terminal 11, desired pre-registered information may be selected from the pre-registered information DB 31 using the received access code as key information. Then, the information-managing server 15 produces usage information from the selected pre-registered information and stores the produced usage information in the usage information DB 32 shown in FIG. 5.

FIG. 5 is a diagram showing an example of a usage information DB. The usage information DB 32 shown in FIG. 5 includes items such as access code, addressee, approach distance and validity period flag. The addressee may be, for example, an e-mail address of the portable terminal 11. The approach distance may be used in a determination step S4 described later.

For example, when the usage information of the access code "0010234" has its approach distance set to "100 (meters)", the information-managing server 15 sends the information content to the destination "user01@fhs.com" when a distance between the target location of the pre-registered information DB 31 and the current location of the portable terminal 11 becomes less than 100 (m).

Therefore, when the approach distance is set to a shorter distance, a certain degree of estimation of the target location is possible. For example, even if it is the user's first visit to the shop, the location of the shop can be estimated to a certain degree. In other words, if the approach distance is appropriately adjusted, the present invention can be used as a navigation system.

The validity period flag represents information related to validity sending for the usage information. Herein, validity sending is understood to mean information contents that are sent to the user of the portable terminal 11 at the start or near end of a validity period.

In the usage information DB 32 of FIG. 5, the validity period flag "0" indicates that validity sending is not selected, "1" indicates that validity sending has been selected at the start of the validity period and "2" indicates that the validity sending has been selected near end of (e.g., three days before the end of) the validity period.

In the user location detecting step S3, for example, a GPS function of the portable terminal 11 is used to send user location information to the information-managing server 15 so that the user location information can be used as the current location of the portable terminal 11. The user location information may also be sent from the radio system base station where the portable terminal 11 currently belongs so that the user location information can be used as the current location of the portable terminal 11. The current location of the portable terminal 11 may also be obtained using art known from Japanese Laid-Open Patent Application Nos. 5-336565, 10-191436 and 2000-156882.

In the determination step S4, the distance between the current location of the portable terminal 11 and the target location of the pre-registered information DB 31 is derived. If the derived distance becomes less than the approach distance, the process proceeds to the sending step S5. If the derived distance is greater than the approach distance, the process does not proceed to the sending step S5.

In the sending step S5, the information-managing server 15 reads the information contents in the pre-registered information DB 31 and the addressee in the usage information DB 32, and sends the information content to the addressee. For example, information content "Day Planner Final Clearance Sale" of access code "0010244" is sent to destination "user02@fhs.com" in the form of an e-mail message.

Figure 6:
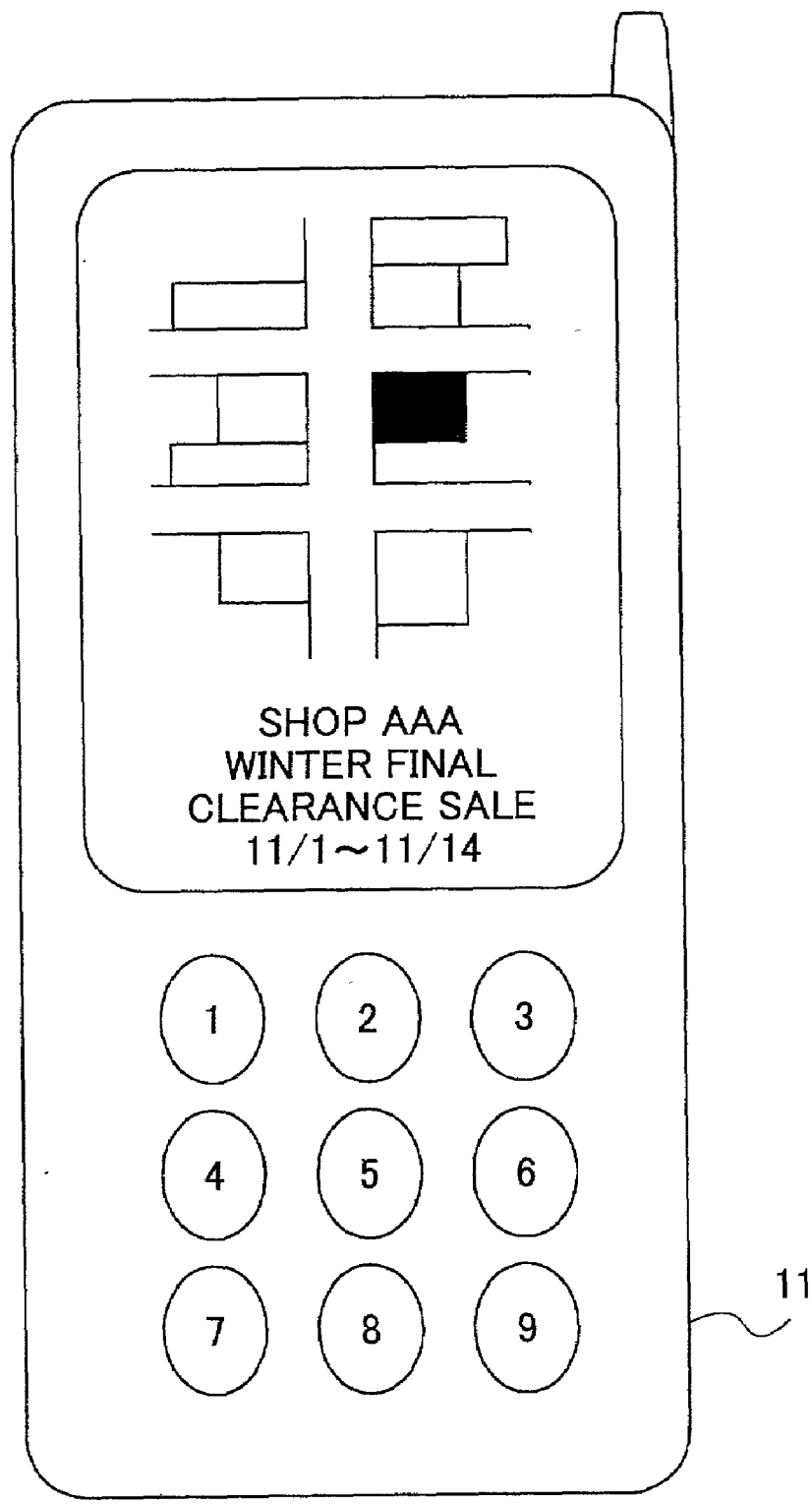
FIG. 6 is a schematic diagram of an example of information content displayed on a screen of a portable terminal.

In other words, when the distance between the current location and the target location becomes less than the approach distance, the user can see the information content as shown in FIG. 6 on the screen of the portable terminal 11. FIG. 6 shows an image diagram of an example of the information content displayed on the screen of the portable terminal 11. FIG. 6 shows an example in which the information content including a text and an image is displayed on the screen of the portable terminal 11, but the information content may include either one of the text and the image.

Accordingly, the user using the portable terminal 11 can register information that he/she does not want to forget (information content) and a location (target location) corresponding to such information in the information-managing server 15. Therefore, since the user can refer to the information content at a location near the target location, it is possible to prevent the user from forgetting the information.

Figure 7:
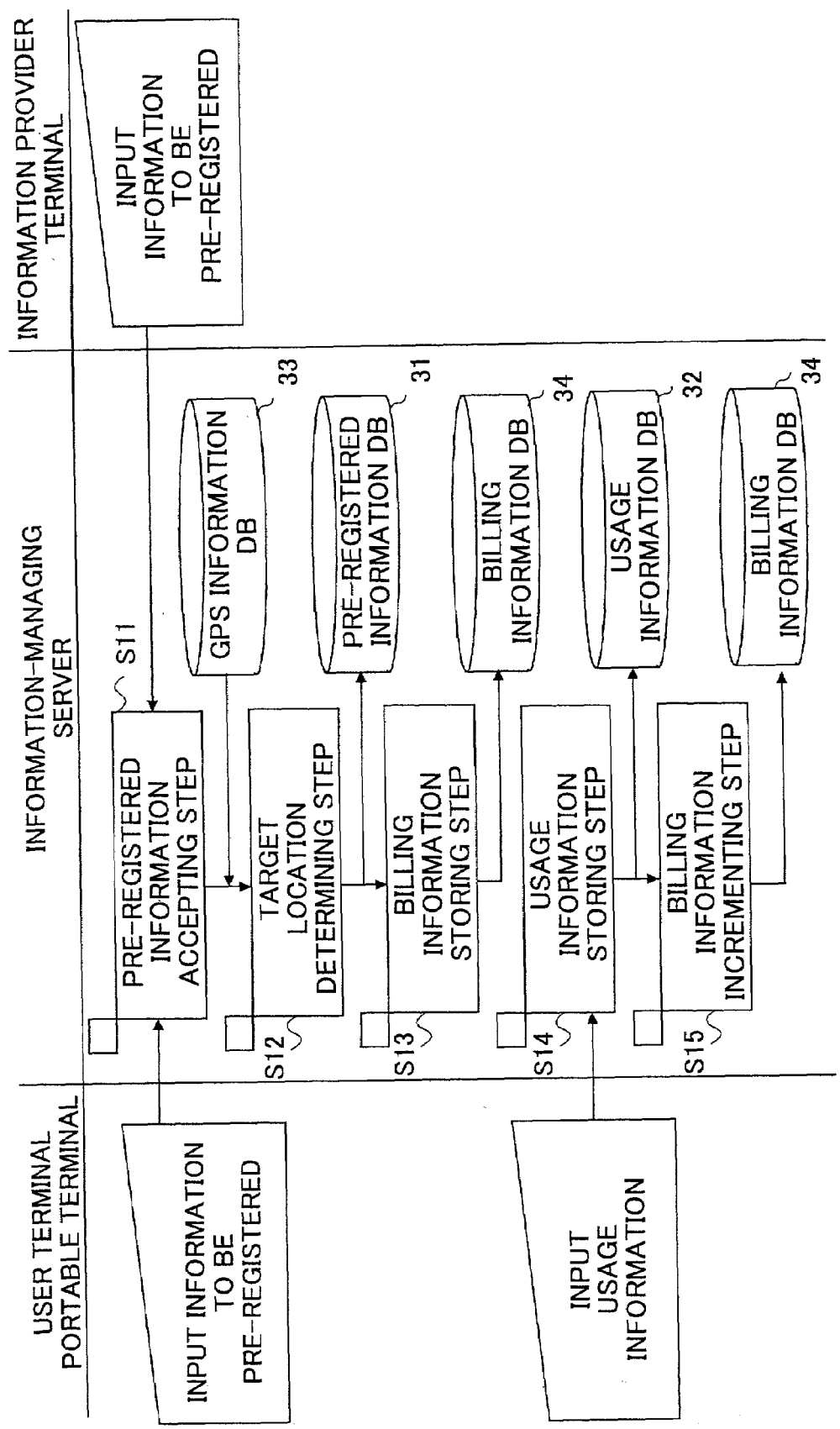
FIG. 7 is a diagram showing an embodiment of a pre-registered information accepting step and a usage information storing step according to the present invention.

Next, the registration information accepting step S1 and the usage information storing step S2 will be described in detail with reference to a flowchart shown in FIG. 7. FIG. 7 shows a flowchart of an embodiment of the registration information accepting step and the usage information storing step.

In a registration information accepting step S11, the information-managing server 15 receives registration information from the portable terminal 11, the user terminal 10 or the information-provider terminal 13. In a target location determining step S12, the target location is determined based on the registration information received by the information-managing server 15.

The target location may also be obtained using art known from Japanese Laid-Open Patent Application Nos. 5-19684 and 2-187898 (now Japanese patent No. 7-60479). Japanese Laid-Open Patent Application Nos. 5-19684 and 2-187898 relate to methods of obtaining location information by inputting telephone numbers.

In a case where the information-managing server 15 receives telephone number data instead of receiving the target location from the portable terminal 10 or the information-provider terminal 13, a location coordinate is obtained from the telephone number using a GPS information DB 33 as shown in FIG. 8. FIG. 8 is a diagram showing an example of the GPS information DB.

The GPS information DB of FIG. 8 includes items such as telephone number and location coordinate. The GPS information DB 33 registers location coordinates such that the location coordinates are linked with telephone numbers. Therefore, the location coordinates can be obtained from the telephone numbers. Further, the location coordinate obtained from the GPS information DB 33 corresponds to the target location. Then, after determining the target location, the information-managing server 15 stores the pre-registration information containing the target location into the pre-registered information DB 31.

In a billing information storing step S13, the information-managing server 15 stores billing information into a billing information DB 34 shown in FIG. 9. FIG. 9 is a diagram showing an example of the billing information DB. The billing information DB of FIG. 9 includes items such as access code, number of uses and number of sendings. The number of uses may be regarded as a counter for counting the number of records for each access code stored in the usage information DB32. The number of sendings may be regarded as a counter for counting the number of times that the information content is sent to the portable terminal 11 for each access code. In other words, since the number of uses and the number of sendings are linked and stored in the billing information DB 34, the billing information DB 34 manages information required for a billing process for each access code.

In a usage information storing step S14, the information-managing server 15 selects pre-registered information from the pre-registered information DB 31 in accordance with instructions from the portable terminal 11, user terminal 10 or the information-provider terminal 13. The pre-registered information may also be selected using the access code described above. The information-managing server 15 produces usage information from the selected pre-registered information and stores the produced usage information in the usage information DB 32.

In a billing information incrementing step S15, the access code of the usage information stored in the usage information DB 32 in step S14 is specified and the number of uses of the specified access code is incremented by 1. Therefore, the number of uses of the billing information DB 34 is incremented by 1 each time the user of the portable terminal 11 selects pre-registered information in step S14.

Figure 10:
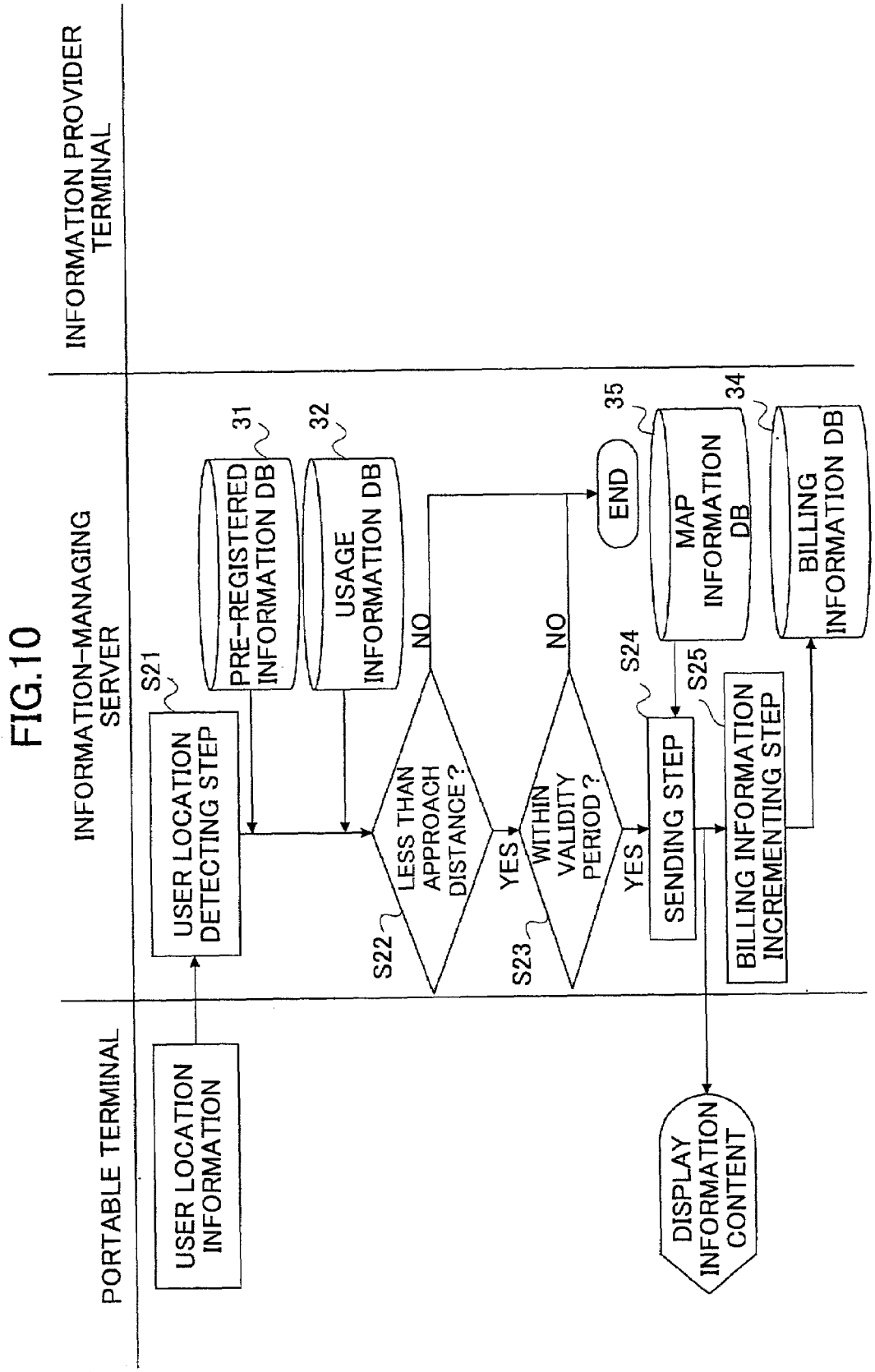
FIG. 10 is a diagram showing an embodiment of a user location detecting step, a determining step and a sending step according to the present invention.

Next, the user location detecting step S3, the determination step S4 and the sending step S5 will be described in detail with reference to a flow chart shown in FIG. 10. FIG. 10 shows a flow chart of an embodiment of the determination step and the sending step.

In a user location detecting step S21, current location of the portable terminal 11 is sent from the portable terminal 11 to the information-managing server 15 such that the current location is regarded as the user location information. The information-managing server 15 reads out the target location from the pre-registered information DB 31 and also reads out the approach distance from the usage information DB 32.

After step S21, the process proceeds to step S22 where the information-managing server 15 derives a distance between the current location of the portable terminal 11 and the target location read out from the pre-registered information DB 31. Then, the information-managing-server 15 determines whether the derived distance is less than the approach distance read out from the usage information DB 32.

If it is determined that the derived distance is less than the approach distance read out from the usage information DB 32 (Step S22; YES), the information-managing server 15 proceeds to step S23. If it is determined that the derived distance is greater than the approach distance read out from the usage information DB 32 (Step S22; NO), the information-managing server 15 terminate the process.

In step S23, the information-managing server 15 reads out the validity period from the pre-registered information DB 31, and determines whether current date and time is within the validity period or not. If it is within the validity period (Step S23; YES), the information-managing server 15 proceeds to step S24. If it is not within the validity period (Step S23; NO), the information-managing server 15 terminates the process. That is to say, even if the derived distance is less than the approach distance read out from the usage information DB 32, the information contents will not be sent to the portable terminal 11 if current date and time is not within the validity period.

In a sending step S24, the information-managing server 15 reads out the information content in the pre-registered information DB 31 and the addressee in the usage information DB 32 and sends the information content to the addressee. Further, the information-managing server 15 may utilize a map information DB 35 to generate an information content containing map information as shown in FIG. 6. The map information DB 35 uses, for example, map data used in a car-navigation system.

In a billing information incrementing step S25, the access code of the information content sent to the portable terminal 11 in step S24 is specified and the number of sendings for the specified access code is incremented by 1. Therefore, the number of sendings stored in the billing information DB 34 is incremented by 1 each time the information content is sent to the portable terminal 11.

Thus, when the user of the portable terminal 11 selects the pre-registered information or the information content is sent to the portable terminal 11, the number of uses and the number of sendings are incremented. Therefore, billing can be achieved in accordance with actual performance.

Figure 11:
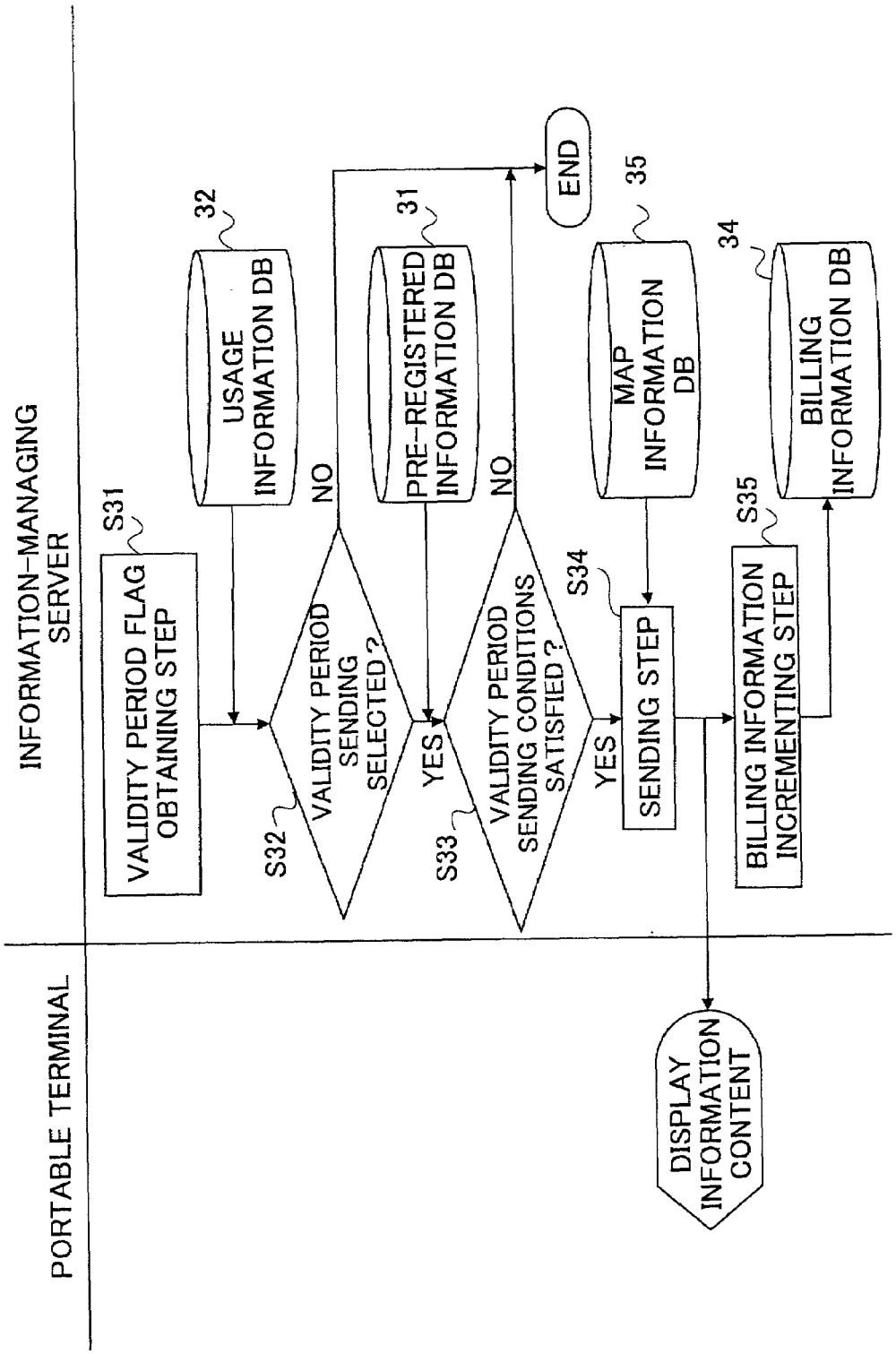
FIG. 11 is a diagram showing an embodiment of a validity period sending step and a sending step according to the present invention.

The information-managing server 15 may perform validity period sending in which the information content is sent to the user of the portable terminal 11 at the start of or near the end of the validity period. FIG. 11 is a diagram showing a flowchart of an embodiment of the validity period sending step and the sending step. The process shown by the flowchart of FIG. 11 is, for example, performed for each predetermined period (e.g., per hour).

In a validity period flag obtaining step S31, the information-managing server 15 obtains a validity period flag from the usage information DB 32. Then, after step S31, the process proceeds to step S32 where the information-managing server 15 determines based on the obtained validity period flag whether the validity period sending is selected.

For example, regarding the validity period flag of FIG. 5, it is determined that validity period sending is selected when the validity period flag has a value other than "0". When it is determined that the validity period sending is selected (Step S32; YES), the information-managing server 15 proceeds to step S33. If it is determined that the validity period sending is not selected (Step S32; NO), the information-managing server 15 terminates the process.

In step S33, the information-managing server 15 obtains the validity period from the pre-registered information DB 31 and determines whether requirements for validity period sending are satisfied. For example, in case of the pre-registered information with the validity period flag of value "1", the information-managing server 15 examines the validity period in the pre-registered information DB 31 to determine whether the validity period has started or not. In case of the pre-registered information with the validity period flag of value "2", the information-managing server 15 examines the validity period in the pre-registered information DB 31 to determine whether it is near end of the validity period or not.

When it is determined that the requirements for validity period sending are satisfied (Step S33; YES), the information-managing server 15 proceeds to step S34. If it is determined that the requirements for validity period sending are not satisfied (Step S33; NO), the information-managing server 15 terminates the process. It is to be noted that sending step S34 is similar to the sending step S24 in FIG. 10 and billing information incrementing step S35 is similar to the billing information incrementing step S25 in FIG. 10, and therefore these steps will not be described in detail.

Figure 12:
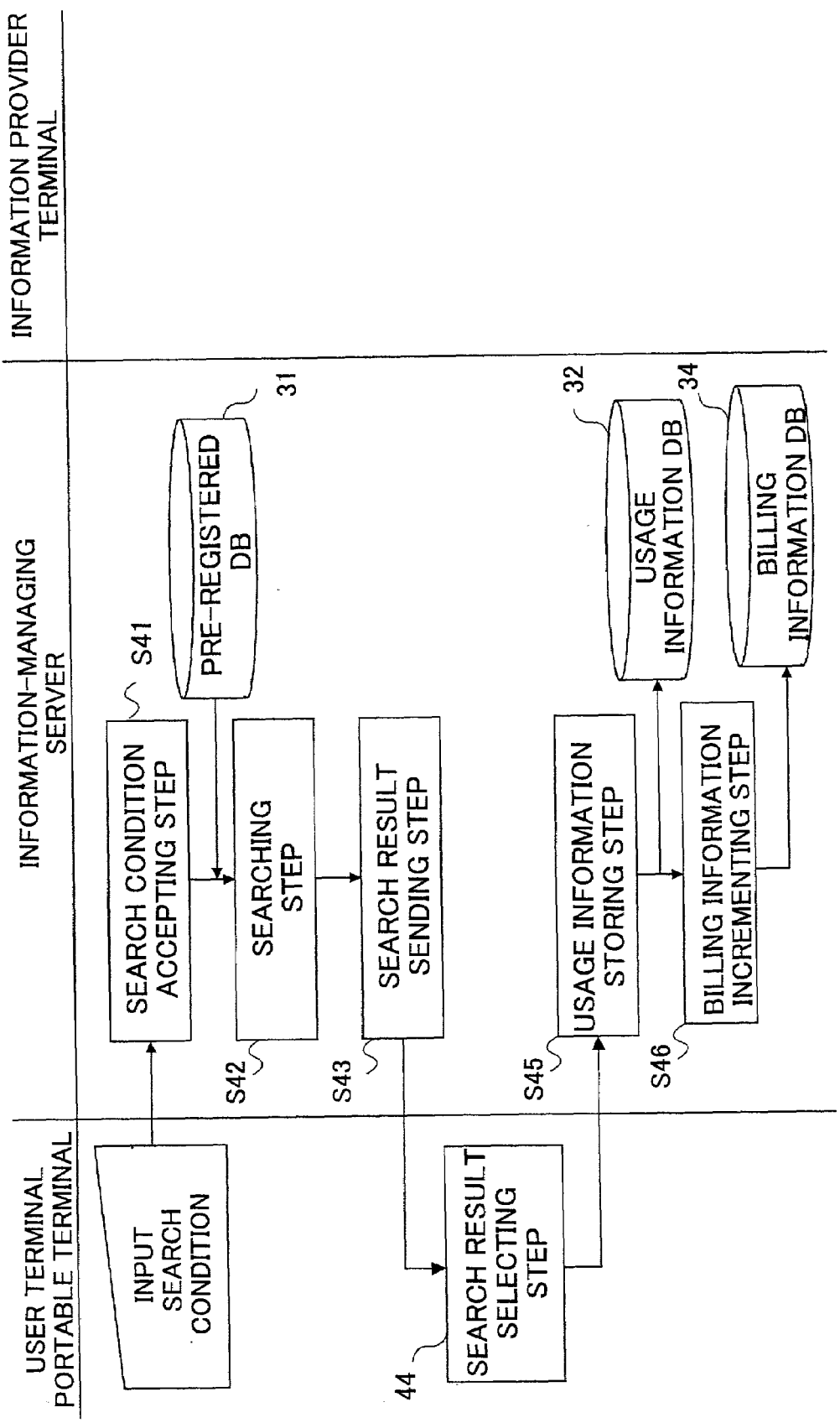
FIG. 12 is a diagram showing an embodiment of a search condition accepting step and a usage information storing step according to the present invention.

Also, the information-managing server 15 can select the pre-registered information that matches search conditions obtained from the pre-registered information DB 31. FIG. 12 is a diagram showing a flowchart of an embodiment of the search condition accepting step and the usage information storing step.

In the search condition accepting step S41, the information-managing server 15 receives search conditions from the portable terminal 11 or from the user terminal 10. The search conditions may be keyword information (such as movies or music) that should interest the user using the portable terminal 11. In a search step S42, the information-managing server 15 searches the pre-registered information DB 31 for pre-registered information that matches the search conditions.

In a search result sending step S43, the information-managing server 15 sends a search result to the portable terminal 11 or to the user terminal 10. Then, in a search result selecting step S44, the user operates the portable terminal 11 or the user terminal 10 to select the desired registration information from the search result. The result selected by the user is transmitted from the portable terminal 11 or the user terminal 10 to the information-managing server 15.

In a usage information registration step S45, the information-managing server 15 selects the pre-registered information from the pre-registered information DB 31 based on the selected result received from the portable terminal 11, the user terminal 10 or the information-provider terminal 13. Then the information-managing server 15 produces usage information from the selected pre-registered information and stores the produced usage information in the usage information DB 32. It is to be noted that the billing information incrementing step S46 is similar to step S15 shown in FIG. 7, and therefore will not be described in detail.

The above-mentioned embodiment relates to an example in which the usage information DB 32 is provided in the information-managing server 15, but the usage information DB 32 may be provided in the portable terminal 11. The following description relates to an example in which the usage information DB 32 is provided in the information-managing server 15.

Figure 13:
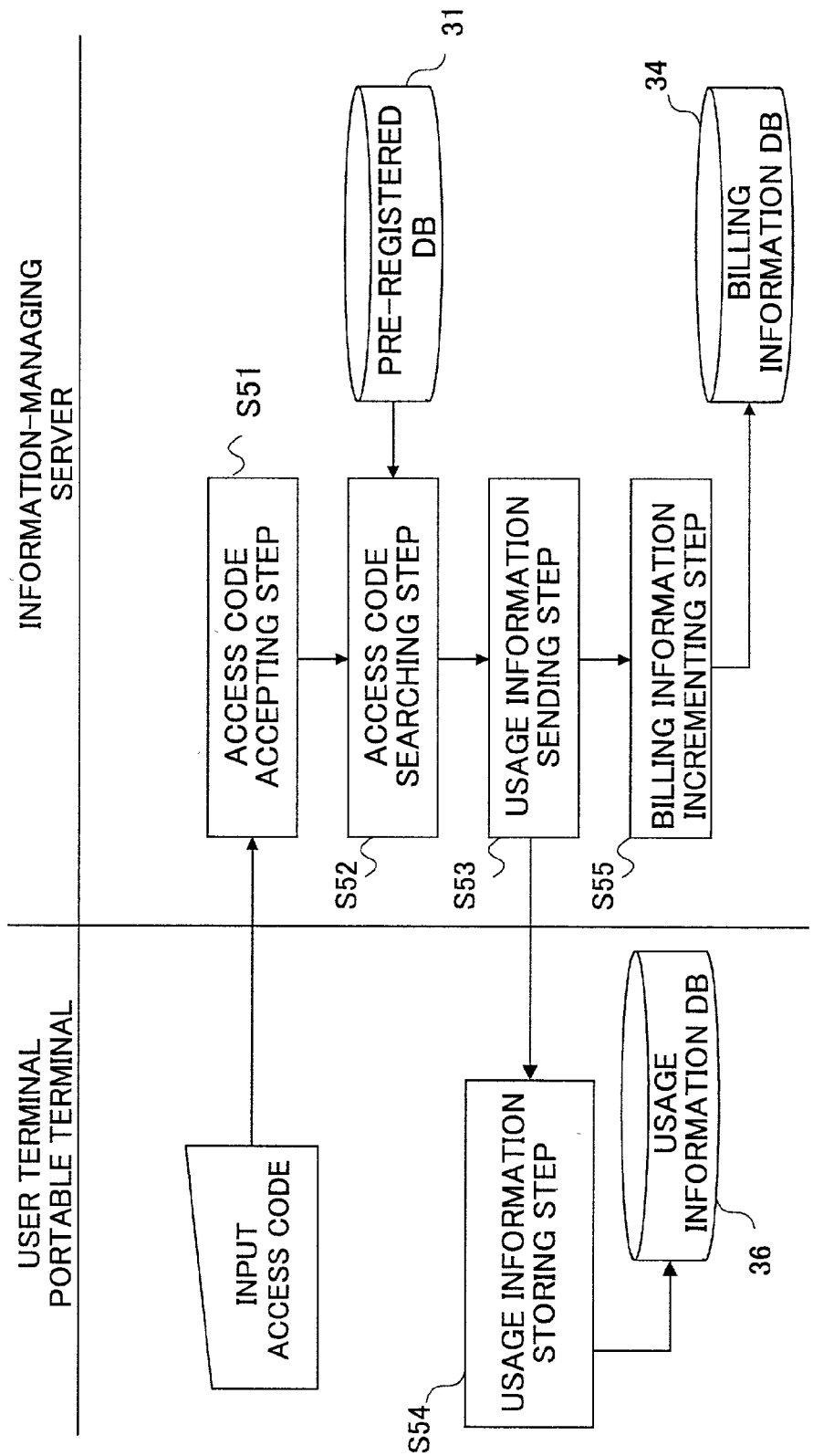
FIG. 13 is a diagram showing another embodiment of a usage information storing step according to the present invention.

FIG. 13 is a diagram showing a flowchart of another embodiment of the usage information registration step. In an access code accepting step S51, the information-managing server 15 receives the access code from the portable terminal 11 or the user terminal 10. In an access code searching step S52, the registration information in the pre-registered information DB 31 is searched based on the received access code.

In a usage information sending step S53, usage information is produced from the pre-registered information searched by the information-managing server 15 and the produced usage information is transmitted to the portable terminal 11. In usage information storing step S54, the portable terminal 11 stores the usage information received from the information-managing server 15 in the usage information DB 36 shown in FIG. 14.

FIG. 14 is a diagram showing another example of the usage information DB. The usage information DB 36 shown in FIG. 14 includes items such as access code, approach distance and valid period. Since the usage information DB 36 includes the approach distance and the target location, the portable terminal 11 itself can determine whether the current location and the target location are less than the approach distance.

Also, after the sending step S53, the information-managing server 15 performs the billing information incrementing step S55. The billing information incrementing step S55 is similar to the billing information incrementing step S15 and therefore will not be described in detail.

Figure 15:
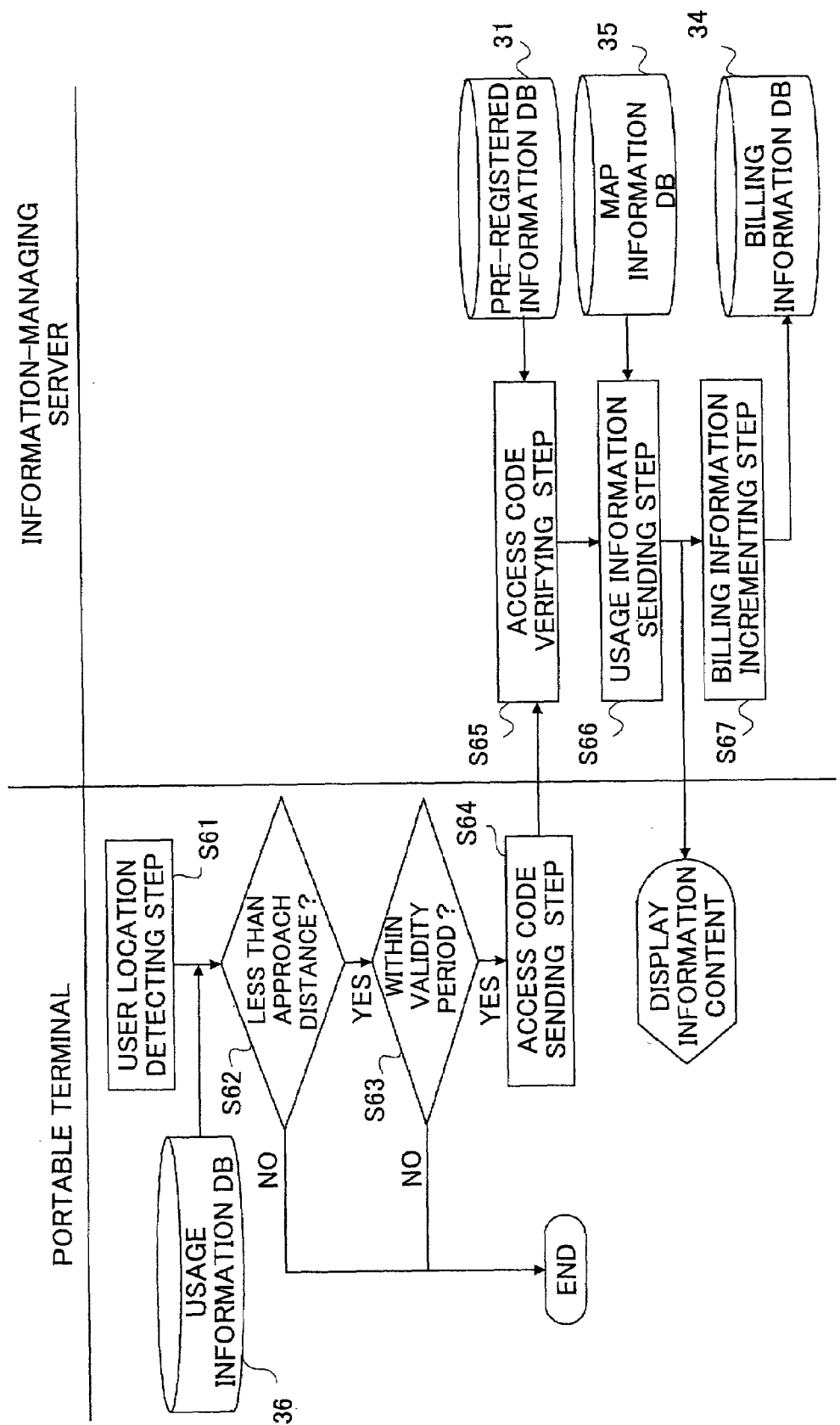
FIG. 15 is a diagram showing another embodiment of a user location detecting step, a determining step and a sending step according to the present invention.

FIG. 15 is a diagram showing a flowchart of another embodiment of the user location detecting step, the determination step and the sending step. In a user location detecting step S61, the portable terminal 11 detects the current location as the user location information. Also, the portable terminal 11 reads out the target location and the approach distance from the usage information DB 36.

After step S61, the portable terminal 11 performs step S62 where the distance between the current location and the target location is derived. Then, the portable terminal 11 determines whether the derived distance is less than the approach distance. If it is determined that the derived distance is less than the approach distance read out from the usage information DB 32 (Step S62; YES), the portable terminal 11 performs step S63. If it is determined that the derived distance is greater than the approach distance read out from the usage information DB 32 (Step S62; NO), the portable terminal 11 terminates the process.

In step S63, the portable terminal 11 reads out the validity period from the usage information DB 36, and determines whether it is within the validity period or not. If it is within the validity period (Step S63; YES), the portable terminal 11 performs step S64. If it is not within the validity period (Step S63; NO), the portable terminal 11 terminates the process.

In an access code sending step S64, the portable terminal 11 transmits the access code of the usage information to the information-managing server 15, the usage information having been determined in step S62 to have a distance less than the approach distance and is within the validity period. In an access code verifying step S65, the information content corresponding to the access code received by the information-managing server 15 is read out from the pre-registered information DB 31.

In a sending step S66, map information corresponding to the access code received by the information-managing server 15 is read from the map information DB 35 if required. The information-managing server 15 sends the information content and the map information to the portable terminal 11. Since billing information incrementing step S67 is similar to the billing information incrementing step S25, further explanation of this step is omitted.

Figure 16:
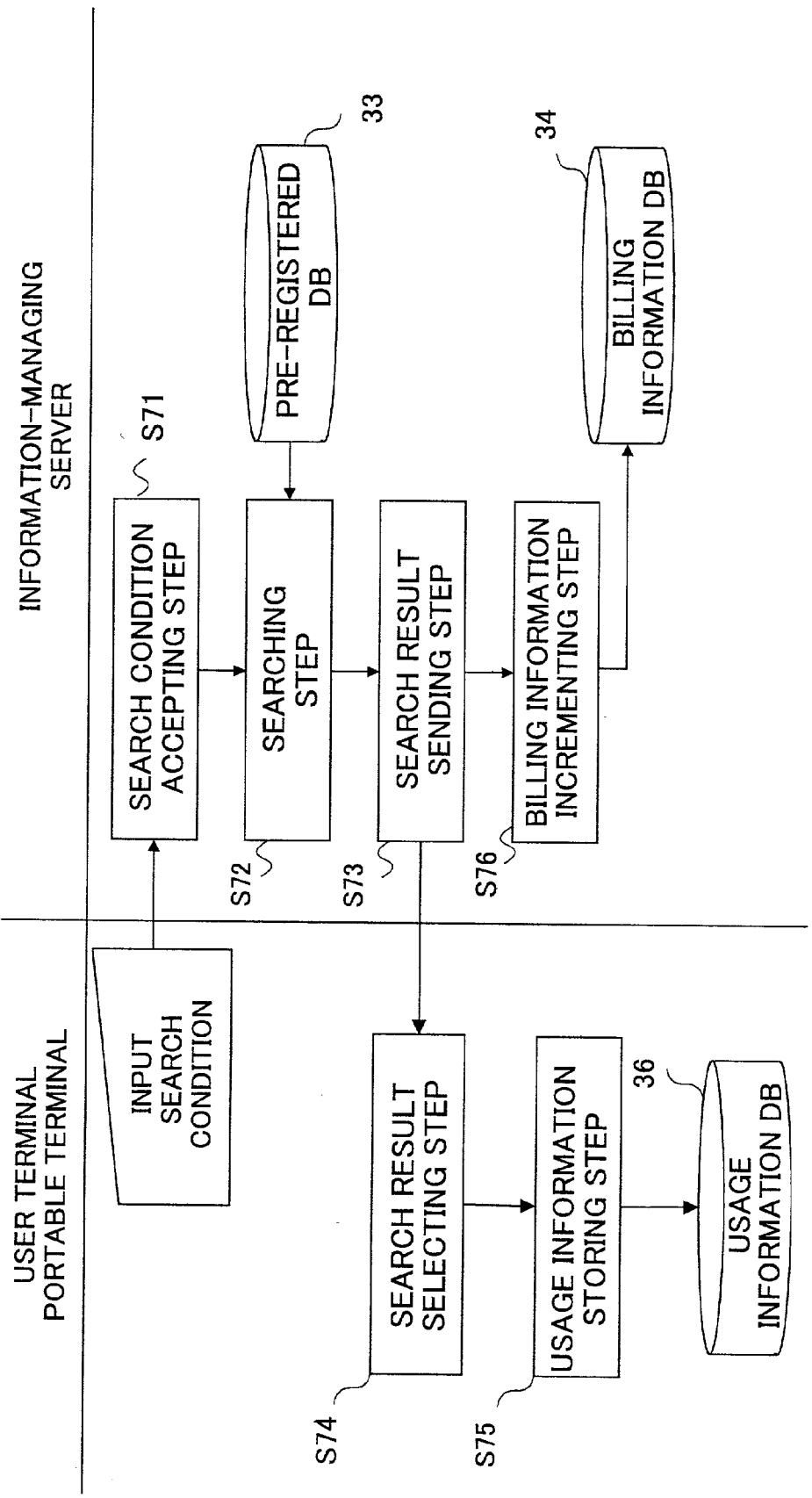
FIG. 16 is a diagram showing another embodiment of a search condition accepting step and a usage information storing step according to the present invention.

FIG. 16 is a diagram showing a flow chart of another embodiment of the search condition accepting step and the usage information storing step. Since search step S72 is similar to the search step S41 and search result sending step S73 is similar to the search result sending step S43, further explanation of these steps is omitted.

In a search result selecting step S74, the user using the portable terminal 11 operates the portable terminal 11 or the user terminal 10 and selects desired information from the search result. In a usage information storing step S75, the portable terminal 11 stores the usage information in the usage information DB 36 based on the result of the selection. Since billing information incrementing step S76 is similar to the billing information incrementing step S46, further explanation of this step is omitted.

Figure 17:
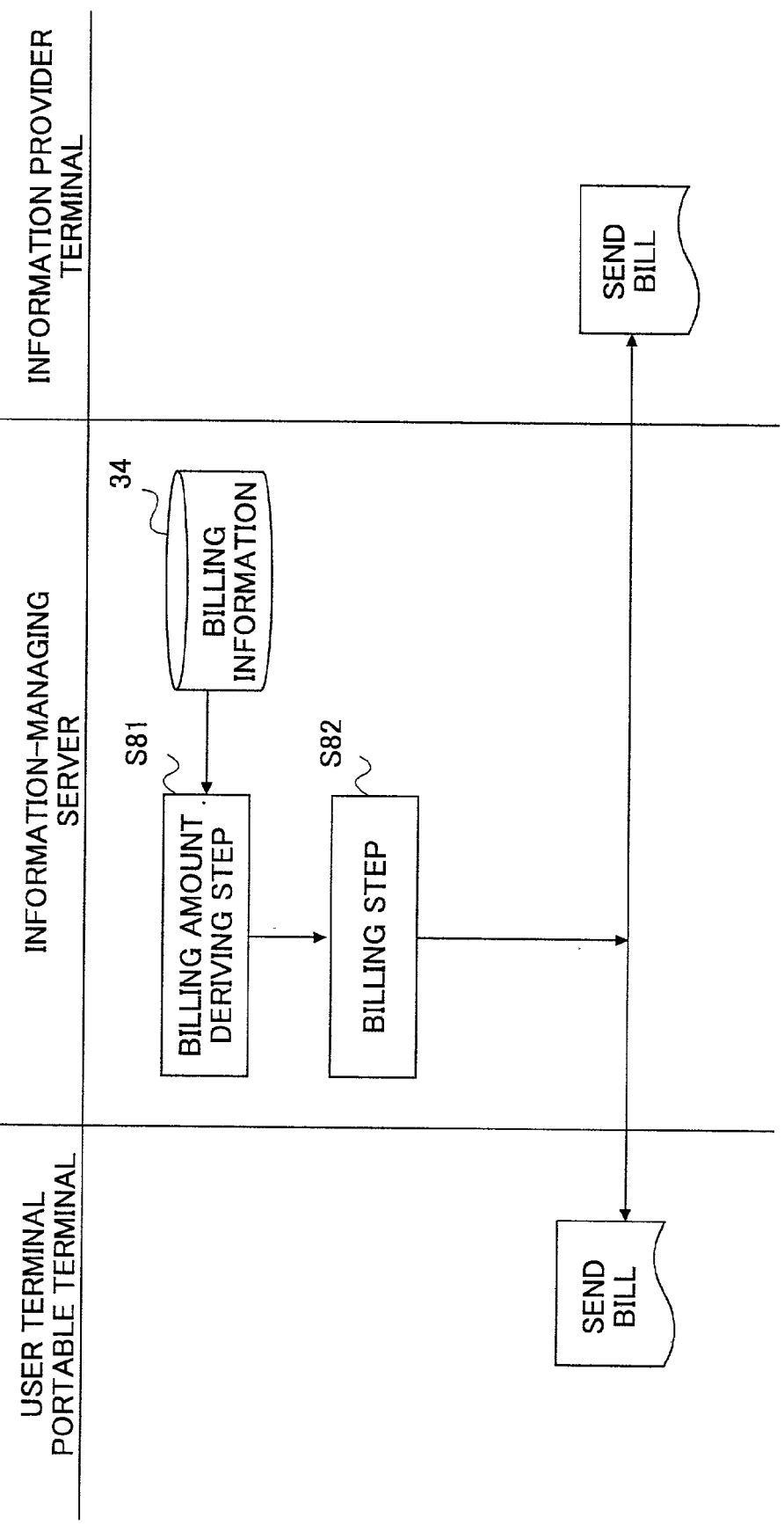
FIG. 17 is a diagram showing an embodiment of a billing step according to the present invention.

FIG. 17 is a diagram showing a flowchart of an embodiment of a billing step. The billing step bills the user of the portable terminal 11 or the information-provider using the information-provider terminal 13 based on the billing information stored in the billing information DB 34.

In a billing amount deriving step S81, the information-managing server 15 reads the number of uses and the number of sendings for a certain period (e.g., per month) from the billing information DB 34 and derives the billing amount from the thus-read out number of uses and number of sendings. In a billing step S82, the user of the portable terminal 11 and the information-provider using the information-provider terminal 13 are billed in accordance with the derived billing amount. Therefore, according to the information-managing server of the present invention, billing can be automatically performed according to actual performance.

In the above-mentioned embodiments, the process terminates when it is determined that the derived distance is greater than the approach distance read out from the user DB 32. However, it is also possible to set an alarm that is activated when there is a transition from a state where the derived distance is less than the approach distance read out from the usage information DB 32 to a state where the derived distance is greater than the approach distance read out from the usage information DB 32.

Further, the present invention is not limited to these embodiments, and variations and modifications may be made without departing from the scope of the present invention.

The present application is based on Japanese priority application No. 2001-216433 filed on Jul. 17, 2001, the entire information contents of which are hereby incorporated by reference.

What is claimed is:

1. A method of managing information, comprising:
pre-registering predetermined information to be sent to at least one portable terminal in such a manner that said predetermined information is linked to first location information;
detecting a current location of said at least one portable terminal such that said current location serves as second location information;
comparing said second location information with said first location information to determine whether a distance between said second location information and said first location information is less than a predetermined distance, and comparing validity period information stored linked with said predetermined information with current date information so as to determine whether to send said predetermined information to said at least one portable terminal; and reading out said predetermined information linked to said first location information and sending said predetermined information to said at least one portable terminal, wherein the predetermined distance is determined by a particular user of the portable terminal for said predetermined information, and said pre-registering comprises receiving an information identification number input through said at least one portable terminal;

reading out said predetermined information and said first location information corresponding to said information identification number from information storage means in which at least said predetermined information and said first location information are stored by being linked with said information identification number; and registering said predetermined information and said first location information read out from said information storage means on an individual portable terminal basis.

2. The method as claimed in claim 1, wherein said registering further comprises:

receiving search condition information input through said at least one portable terminal;

searching said predetermined information corresponding to said search condition information from an information storage means in which at least said predetermined information and said first location information are stored linked and reading out said predetermined information and said first location information linked with said predetermined information; and storing said predetermined information and said first location information read out from said information storage means for each of the portable terminals.

3. The method as claimed in claim 1, further comprising after sending the read-out predetermined information to said at least one portable terminal, billing an information provider who has provided said predetermined information.

4. A method of managing information, comprising:

receiving first location information stored linked with predetermined information in an information-managing server;

detecting a current location of at least one portable terminal such that said current location serves as second location information;

comparing said second location information and said first location information to determine whether a distance between said second location information and said first location information is less than a predetermined distance, and comparing validity period information stored linked with said predetermined information with current date information, and determining whether to send said predetermined information; and sending the result of the determination to said information-managing server and said predetermined information stored linked with said first location information being sent from said information-managing server, wherein the predetermined distance is determined by a particular user of the portable terminal for said predetermined information, and said receiving first location information comprises receiving an information identification number input through said at least one portable terminal;

reading out said predetermined information and said first location information corresponding to said information identification number from information storage means in which at least said predetermined information and said first location information are stored by being linked with said information identification number; and registering said predetermined information and said first location information read out from said information storage means on an individual portable terminal basis.

5. A computer readable medium storing program code for causing a computer to manage information, comprising:

first program code means for registering predetermined information to be sent to at least one portable terminal such that said predetermined information is linked with first location information;

second program code means for detecting a current location of said at least one portable terminal such that said current location serves as second location information;

third program code means for comparing said second location information with said first location information to determine whether a distance between said second location information and said first location information is less than a predetermined distance, and for comparing validity period information stored linked with said predetermined information with current date information so as to determine whether to send said predetermined information; and fourth program code means for reading out said predetermined information linked to said first location information and sending said predetermined information to said at least one portable terminal, wherein the predetermined distance is determined by a particular user of the portable terminal for said predetermined information, and said first program code means comprises program code means for receiving an information identification number input through said at least one portable terminal;

program code means for reading out said predetermined information and said first location information corresponding to said information identification number from information storage means in which at least said predetermined information and said first location information are stored by being linked with said information identification number; and program code means for registering said predetermined information and said first location information read out from said information storage means on an individual portable terminal basis.

6. A server for managing information, said server comprising:

storing means for storing predetermined information to be sent to at least one portable terminal in such a manner that said predetermined information is linked to first location information;

detecting means for detecting a current location of said at least one portable terminal such that said current location serves as second location information;

determining means for comparing said second location information to said first location information to determine whether a distance between said second location information and said first location information is less than a predetermined distance, and for comparing validity period information stored linked with said predetermined information with a current date information so as to determine whether to send said predetermined information; and sending means for reading out said predetermined information linked to said first location information and sending said predetermined information to said at least one portable terminal, wherein the predetermined distance is determined by a particular user of the portable terminal for said predetermined information, and said storing comprises receiving an information identification number input through said at least one portable terminal;

reading out said predetermined information and said first location information corresponding to said information identification number from information storage means in which at least said predetermined information and said first location information are stored by being linked with said information identification number; and registering said predetermined information and said first location information read out from said information storage means on an individual portable terminal basis.

7. A system, comprising:

a server, at least one portable terminal connected to said server via a network and at least one information-provider terminal connected to said server via the network, said at least one portable terminal having means for locating its current location; and said server further comprising:

storing means for storing predetermined information to be sent to at least one portable terminal in such a manner that said predetermined information is linked to first location information;

detecting means for detecting the current location of said at least one portable terminal such that said current location serves as second location information;

determining means for comparing said second location information with said first location information to determine whether a distance between said second location information and said first location information is less than a predetermined distance, and for comparing validity period information stored linked with said predetermined information with current date information so as to determine whether to send said predetermined information; and sending means for reading out said predetermined information linked to said first location information and sending said predetermined information to said at least one portable terminal, wherein the predetermined distance is determined by a particular user of the portable terminal for said predetermined information, and said storing means comprises:

receiving means for receiving an information identification number input through said at least one portable terminal;

reading means for reading out said predetermined information and said first location information corresponding to said information identification number from information storage means in which at least said predetermined information and said first location information are stored by being linked with said information identification number; and registering means for registering said predetermined information and said first location information read out from said information storage means on an individual portable terminal basis.

8. A computer readable medium storing program code for causing a computer to manage information, by:

registering predetermined information to be sent to at least one portable terminal such that said predetermined information is linked with first location information;

detecting a current location of said at least one portable terminal such that said current location serves as second location information;

comparing said second location information to said first location information to determine whether a distance between said second location information and said first location information is less than a predetermined distance, and comparing validity period information stored linked with said predetermined information with current date information so as to determine whether to send said predetermined information; and reading out said predetermined information linked to said first location information and sending said predetermined information to said at least one portable terminal, wherein the predetermined distance is determined by a particular user of the portable terminal for said predetermined information, and said registering comprises receiving an information identification number input through said at least one portable terminal;

reading out said predetermined information and said first location information corresponding to said information identification number from information storage means in which at least said predetermined information and said first location information are stored by being linked with said information identification number; and registering said predetermined information and said first location information read out from said information storage means on an individual portable terminal basis.

* * * * *